Jan. 2, 1934.  A. F. STERNAD  1,942,264
MACHINE FOR COILING SOLDER
Filed May 6, 1930  5 Sheets-Sheet 1
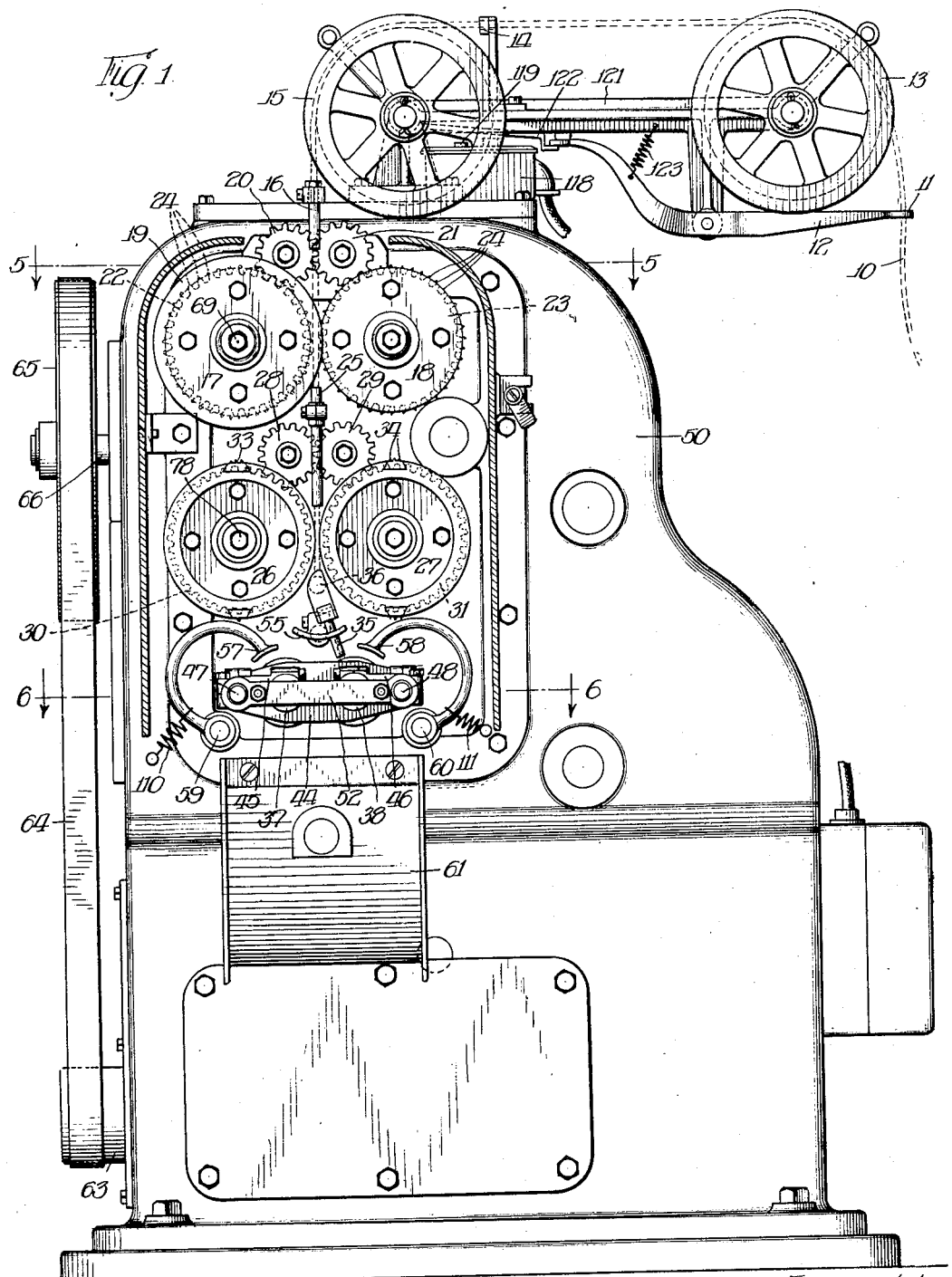
Inventor:
Andrew F. Sternad,
By Cromwell, Greist & Warden
Attys.

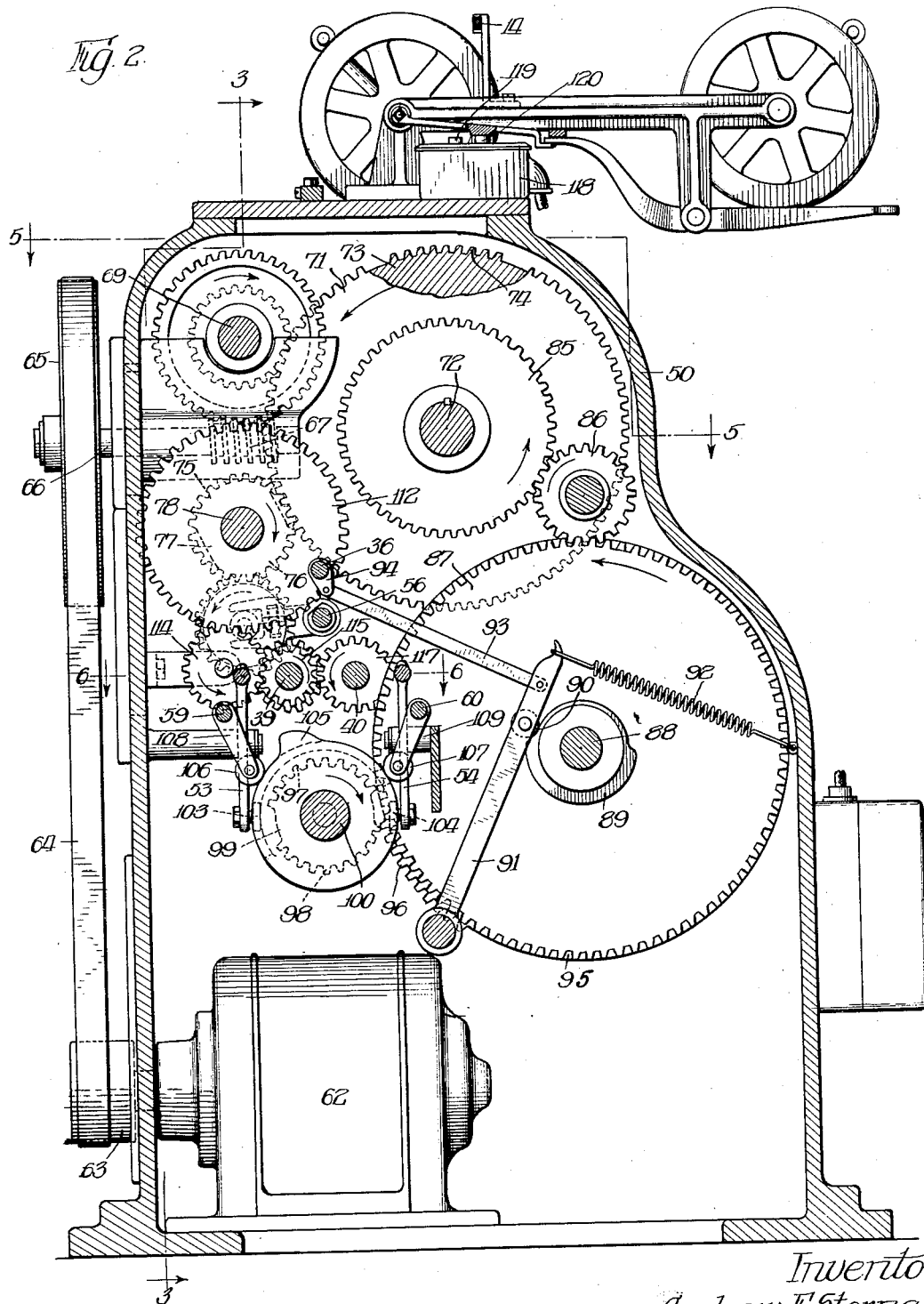

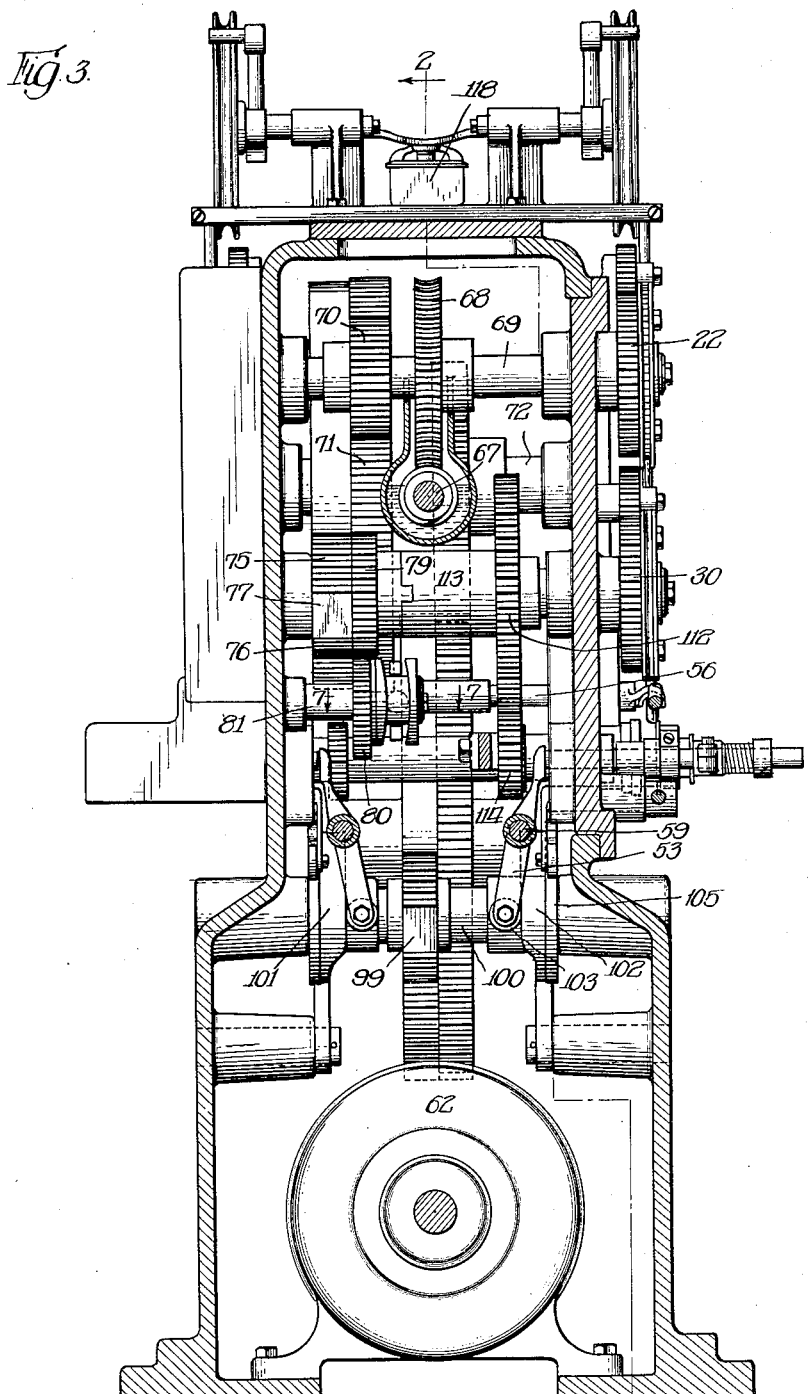

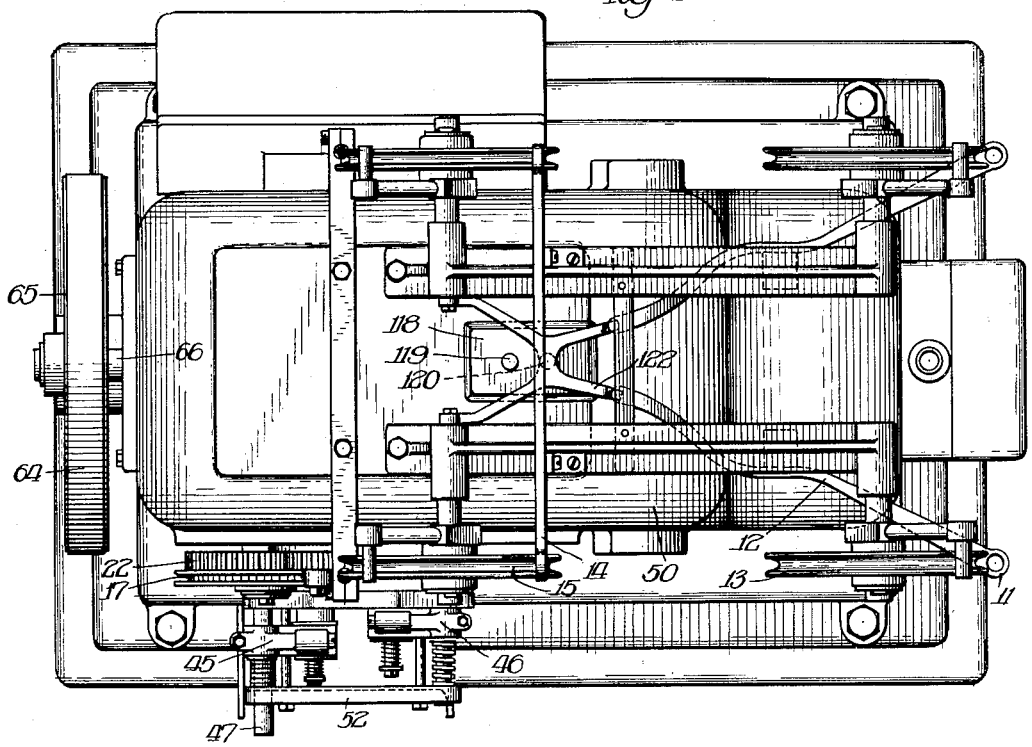

Jan. 2, 1934.   A. F. STERNAD   1,942,264
MACHINE FOR COILING SOLDER
Filed May 6, 1930   5 Sheets-Sheet 5
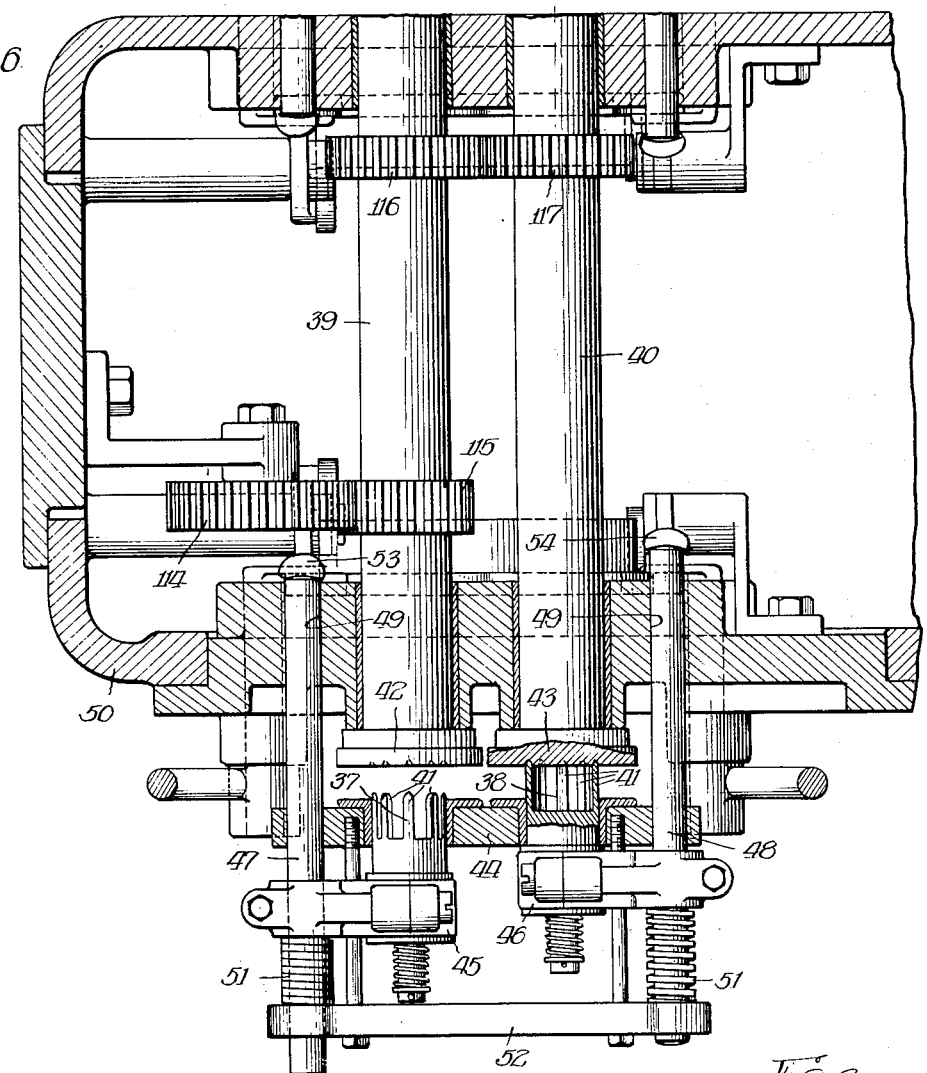
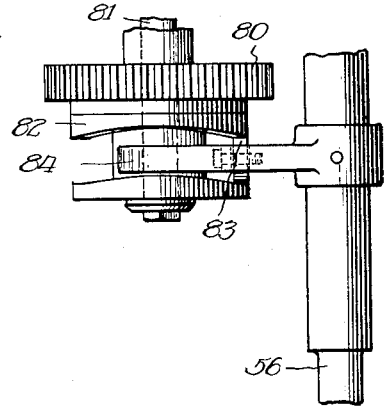
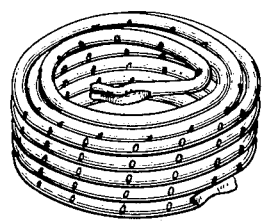
Inventor
Andrew F. Sternad,
By Cromwell, Greist & Warden
Attys.

Patented Jan. 2, 1934

1,942,264

UNITED STATES PATENT OFFICE 1,942,264

MACHINE FOR COILING SOLDER

Andrew F. Sternad, Chicago, Ill., assignor to Gardiner Metal Co., Chicago, Ill., a corporation of Illinois Application May 6, 1930. Serial No. 450,213

16 Claims. (Cl. 140—92.2)

The principal object of the invention is to provide a machine which will take solder and automatically coil it up in predetermined lengths at a high rate of speed.

Another important object is to provide an automatic coiling machine which will take solder having a core of acid or other fluent material and operate on it in such a way as to prevent seepage of the acid from the cut ends.

Other objects and advantages of the invention will be apparent to those skilled in the art upon a full understanding of the construction, arrangement and operation of the improved coiling machine.

One form of the invention is presented herein for the purpose of exemplification, but it will of course be appreciated that the invention is susceptible of embodiment in other structurally modified forms coming equally within the scope of the appended claims.

In the accompanying drawings:

Fig. 1 is a side view of the machine of the invention, with the guard plate broken away to show the feeding, cutting and winding devices;

Fig. 2 is a vertical section through the machine, taken on approximately the line 2—2 of Fig. 3;

Fig. 3 is another vertical section through the machine, taken at right angles to Fig. 2 on approximately the line 3—3 of Fig. 2;

Fig. 4 is a plan view of the machine;

Fig. 5 is a horizontal section through the upper portion of the machine, taken on approximately the line 5—5 of Fig. 1 or the line 5—5 of Fig. 2;

Fig. 6 is a fragmentary horizontal section through the lower portion of the machine, taken on approximately the line 6—6 of Fig. 1 or the line 6—6 of Fig. 2;

Fig. 7 is another fragmentary horizontal section, taken on approximately the line 7—7 of Fig. 3; and Fig. 8 is a perspective view of one of the coils produced with the machine.

The machine shown in the drawings is adapted to produce two coils of solder at the same time on duplicate coiling mechanisms operating at opposite sides of the machine. Inasmuch as both coiling mechanisms are the same in construction and operation and are controlled by the same power transmitting mechanism, only one of such mechanisms is shown in detail in the drawings and is hereinafter described.

The core solder to be made up into coils is about an eighth of an inch in diameter, although it may be larger or smaller, and is fed to the machine in an endless form at 10. The solder passes upwardly through an eyelet 11 on one end of a power shut-off arm 12; travels through an arc of 90° over a grooved idling pulley 13; passes horizontally through a stationary guide 14; travels through another arc of 90° over another grooved idling pulley 15; passes downwardly through a stationary guide tube 16; and is directed by the tube 16 between the peripheries of two feeding and crimping rolls 17 and 18 which are spaced apart only far enough to permit the solder to pass between the same. The roll 17 is a little wider than the roll 18 and is provided with side flanges 19 which lap the periphery of the roll 18 at the point where the solder passes between the rolls. The rolls 17 and 18, which are connected together for rotation in opposite directions at a constant rate of speed by two inter-meshed pinions 20 and 21 which mesh with two gears 22 and 23 attached to the rear faces of the rolls, are provided at their peripheries with a large number of circumferentially spaced crimping projections 24. The rolls 17 and 18 draw the solder through the previously described guiding devices, and the projections 24 on the rolls serve to crimp the soft walls of the solder at spaced points, with the result that the acid-filled interior of the solder is divided up into a large number of short cells which are practically sealed off from each other.

From the feeding and crimping rolls 17 and 18, the solder moves downwardly, first through a stationary guide tube 25 and then through a space present between the peripheries of two closely arranged disks 26 and 27. The disks 26 and 27, which are connected together for intermittent rotation of 180° in opposite directions by intermeshing pinions 28 and 29 which mesh with two gears 30 and 31 attached to the rear faces of the disks, are provided on their peripheries at diametrically opposite points with chisel-shaped cutting projections 33 and with sealing corrugations 34 of slightly less height both in front of and behind the cutting projections. When an accurately predetermined length of the solder has been fed downwardly by the feeding rolls 17 and 18 through the space between the cutting disks 26 and 27, the latter are rapidly rotated 180° and the two cutters 33 shown at the tops of the disks, in moving into positions at the bottoms of the disks, pass each other in edgewise abutment and sever the solder at the desired point. At the same time, the corrugations 34 adjacent the cutters collapse the acid-filled ends of the solder in minute crimps and effectively seal off the cut ends.

After passing between the disks 26 and 27, the solder moves downwardly through a pivoted guide tube 35, which tube is attached at its upper end to a rearwardly extending rock shaft 36 and directs the cut and sealed end of the solder toward either one of two winding spindles 37 and 38, depending upon the particular position into which the tube 35 has been previously swung by the shaft 36.

The spindles 37 and 38 are arranged in axial alignment with two constantly rotating shafts 39 and 40 and are characterized by rearwardly extending fingers 41 which are spaced apart in circles and are adapted to clutch at certain times with correspondingly positioned indentations in chucks 42 and 43 mounted on the front ends of the shafts 39 and 40. The spindles 37 and 38 are journaled in bearings in a stationary cross plate 44 and are also journaled in bearings in two laterally extending brackets 45 and 46 attached to two rods 47 and 48. The rods 47 and 48 are shiftably mounted in guideways 49 formed in the casing 50 of the machine and are pressed rearwardly by coil springs 51 which encircle the front portions of the rods and are compressed between the brackets 45 and 46 and a stationary cross plate 52 through which the front ends of the rods extend. The rods 47 and 48 are alternately shifted forwardly against the yielding resistance of the return springs 51 by two levers 53 and 54. When the rod 47 is shifted forwardly, the winding spindle 37 is retracted from the rotating chuck 42 into the position shown in Fig. 6, causing the coil of solder which has been wound on that spindle to be stripped therefrom. At the same time that the spindle 37 is retracted, the spindle 38 is advanced into clutched engagement with the rotating chuck 43, and vice versa.

Continuing the description of the travel of the solder through the machine—the cut and sealed end of the solder passing downwardly through the tube 35 is directed by the latter toward the axis of the particular winding spindle which will next move into clutched engagement with its associated chuck, whereupon such end passes into a position opposite the spindle and the latter is shifted into clutched position with the solder between two of the fingers 41. The rotation of the spindle immediately bends the solder abruptly about the periphery of the spindle at a point closely adjacent the end and winds the solder on the spindle to a depth of several layers. During the winding, the lower end of the guide tube 35 is oscillated back and forth across the effective width of the spindle by a laterally elongated guide loop 55 which loosely embraces the tube 35 and is attached to the front end of a reciprocating rod 56, operated by mechanism to be described, thereby causing each layer to be wound evenly in a helical form. When the cut and sealed trailing end of the piece of solder being wound reaches the spindle to complete the coil thereon, such end is pressed down on the coil by one of two arms 57 and 58 which are attached to two rock shafts 59 and 60. At about the same time, the spindle is retracted, and the completed coil is discharged through a chute 61 into a box or other receptacle. At the instant that one coil is finished and discharged, another coil is started without interruption on the other spindle, the guide tube 35 being swung over toward the empty spindle at that time by mechanism to be described.

The power used in operating the machine is derived from an electric motor 62, and the power-transmitting mechanism employed, which is housed completely within the casing 50 above the motor, consists generally of means for continuously rotating the feeding and crimping rolls 17 and 18, means for intermittently rotating the sealing and cutting disks 26 and 27, means for intermittently rocking the shaft 36 which directs the guide tube 35, means for continuously reciprocating the rod 56 which oscillates the lower end of the tube 35, means for intermittently moving the levers 53 and 54 which retract the spindles, means for intermittently rocking the shafts 59 and 60 which swing the arms 57 and 58, and means for continuously rotating the shafts 39 and 40, all in proper synchronism.

The power-transmitting mechanism may of course assume a great many different forms. In the particular form shown in the drawings, the armature shaft of the motor 62 carries a pulley 63, which pulley is connected by a belt 64 to another pulley 65 on a shaft 66. The shaft 66 is journaled in the upper portion of the casing 50 and is provided with a worm 67 which drives a worm wheel 68 attached to a shaft 69. One end of the shaft 69 carries the left hand feeding and crimping roll 17 of the coiling mechanism at one side of the machine, while the other end of the shaft 69 carries the right hand feeding and crimping roll of the duplicate coiling mechanism at the other side of the machine, thereby providing motive power for both sets of feeding and crimping rolls.

The shaft 69 also carries a pinion 70 which meshes with a large gear 71 which is secured to a countershaft 72. A segment gear 73 is attached to the shaft 72 against the rear face of the gear 71 and is provided at one point in its periphery with a group of teeth 74 which mesh intermittently with first one and then the other of two groups of teeth 75 and 76 on diametrically opposite portions of a double segment pinion 77 attached to a shaft 78. One end of the shaft 78 carries the left hand sealing and cutting disk 26 of the coiling mechanism at one side of the machine, while the other end of the shaft 78 carries the right hand sealing and cutting disk of the duplicate coiling mechanism at the other side of the machine, thereby providing motive power for both sets of sealing and cutting disks. The gear 71 meshes with a pinion 79 which is journaled on the shaft 78 alongside the intermittently rotating double segment pinion 77, and the pinion 79 in turn meshes with a pinion 80 which is journaled on a stub shaft 81. The pinion 80, which is continuously rotated by the train of gears described, carries a circular groove cam 82 into which a cam follower 83 extends. The follower 83 is mounted on a forked arm 84, and the arm 84 is secured to the previously described shaft 56. The rotation of the cam 82 reciprocates the shaft 56, and the latter oscillates the lower end of the guide tube 35 back and forth to cause the solder passing through the tube to be wound in helical layers on the spindles. One end of the shaft 56 acts upon the guide tube 35 of the coiling mechanism at one side of the machine, while the other end of the shaft 56 acts upon the corresponding guide tube of the coiling mechanism at the other side of the machine.

The countershaft 72 carries a gear 85 which meshes with a pinion 86 which in turn meshes with a large gear 87 attached to another countershaft 88. The countershaft 88 carries an eccentric cam 89 which coacts with a cam follower 90 on a pivoted lever 91. The lever 91 is urged toward the cam by a spring 92 and is connected by a long link 93 to a short arm 94 attached to the previously described rock shaft 36. The raised portion of the cam 89 extends through an angle of 180°, with the result that, during one-half of each revolution of the cam 87, the shaft 36 is rocked into one position and, during the other half of each revolution, the shaft 36 is rocked in the opposite direction into another position. The guide tube 35 of the coiling mechanism at one side of the machine is attached to one end of the shaft 36, while the corresponding guide tube of the coiling mechanism at the other side of the machine is attached to the other end of such shaft.

The countershaft 88 carries a large segment gear 95 which is provided at one point in its periphery with a group of teeth 96 which mesh intermittently with first one and then the other of two groups of teeth 97 and 98 on diametrically opposite portions of a double segment pinion 99 attached to a shaft 100. The shaft 100 carries two circular cams 101 and 102. The cam 101 causes retraction of the winding spindles of the coiling mechanism at one side of the machine, while the cam 102 causes retraction of the winding spindles of the coiling mechanism at the other side of the machine in precisely the same manner. The operation of the cam 102 only need be described here. Two cam followers 103 and 104 coact with the cam 102 at diametrically opposed points on the latter and are attached to the previously described levers 53 and 54. The segment gear 95 and the double segment pinion 99 cause the cam 102 to come to rest for a short period after each one-half revolution. During one of the one-half revolutions, the lever 53 only is oscillated, while during the other one-half revolution the lever 54 only is oscillated.

The circular cam 102 has associated therewith an eccentric cam 105 with which two cam followers 106 and 107 coact. The follower 106 is carried by an arm 108 which is attached to the previously described rock shaft 59, while the follower 107 is carried by an arm 109 which is attached to the rock shaft 60. During one one-half revolution of the shaft 100, the arm 57 is caused by the cam 105 to swing toward the axis of the spindle 37 against the yielding resistance of a return spring 110, and, during the other one-half revolution, the arm 58 is caused to swing toward the axis of the spindle 38 against the yielding resistance of a return spring 111.

The shafts 39 and 40 which carry the chucks 42 and 43 are continuously rotated in opposite directions by a gear 112 which is journaled on the shaft 78 and is attached to the pinion 79 through a connecting sleeve 113. The gear 112 meshes with a pinion 114, and the pinion 114 in turn meshes with a pinion 115 on the shaft 39, thereby rotating the latter. The shaft 40 is rotated from the shaft 39 through two inter-meshing pinions 116 and 117 attached to the shafts.

The motor 62 is started or stopped by means of an electric switch 118 which is mounted on top of the casing 50. A button 119 is pressed to start the motor, and a button 120 is pressed to stop the same. The arm 12 which carries the eyelet 11 through which the solder is threaded is pivoted intermediate its ends to a bracket 121 on the casing, and the end of the arm 12 opposite the eyelet 11 is positioned directly above one end of an arm 122. The arm 122 rests upon the stop button 120 and is pivoted at its opposite end to the bracket 121. The end of the arm 12 above the end of the arm 122 is normally supported by a spring 123. Should a kink or other irregularity appear in the solder approaching the machine at 10, such irregularity will engage with the eyelet 11 and will tilt the arm 12, causing the arm 122 to depress the button 120 and instantly stop the machine.

I claim:

1. In an automatic coiling machine, a pair of spindles of substantially the same diameter as the inside of the coil to be formed, means for feeding the material to be coiled first into engagement with one spindle and then into engagement with the other, means for rotating the spindle to which the material is fed to cause the material to be wound directly thereon, means for causing each spindle to grip the leading end of the material to be coiled thereon, means for cutting the material being coiled on either spindle into a predetermined length to complete the coil on that spindle, and means for stripping the completed coil from the spindle.

2. In an automatic coiling machine, a pair of spindles of substantially the same diameter as the inside of the coil to be formed, means for feeding the material to be coiled, means for directing the material first into engagement with one spindle and then into engagement with the other, means for rotating the spindle to which the material is directed to cause the material to be wound directly thereon, means for causing the spindle to grip the leading end of the material to be coiled thereon, means for causing the material to be wound in helical layers on the spindle, means for cutting the material being coiled on either spindle into a predetermined length to complete the coil on that spindle, and means for stripping the completed coil from the spindle.

3. In a machine for automatically forming solder into coils, a rotating spindle to which the solder is fed and onto which it is directly wound, means for causing one end of the solder to become interlocked with the spindle circumferentially but not axially of the latter, and means for removing the coil axially from the spindle.

4. In a machine for automatically forming core solder into coils, a rotating spindle to which the solder is fed, means for crimping the solder at intervals, means for causing one end of the solder to become attached to the spindle, means for cutting the solder into a predetermined length, and means for removing the coil from the spindle.

5. In an automatic coiling machine, a spindle having a generally cylindrical periphery and an opening therein, means for causing the leading end of the material to be coiled to be positioned within the opening in the spindle, means for rotating the spindle to cause the material to be wound about the periphery of the spindles in a number of layers, and means for cutting the material at a predetermined point to complete the coil.

6. In an automatic coiling machine, a spindle, means for feeding the material to be coiled to the spindle, means for cutting the material at a predetermined point to complete the coil, and means for pressing the cut end of the material against the body of the coil.

7. In an automatic coiling machine, a spindle, means for feeding the material to be coiled to the spindle, means for rotating the spindle, means for causing the material to be wound in helical layers on the spindle, means for stripping the completed coil axially from the spindle, and means for laterally ejecting the stripped coil from the machine.

8. In an automatic coiling machine, a spindle, means for feeding the material to be coiled to the spindle, means for rotating the spindle several revolutions to cause the material to be wound into a multiple-layer coil about the outer periphery of the spindle, a coil-removing member at one end of the spindle, and means for causing relative axial movement between the spindle and member whereby to strip the coil from the spindle.

9. In a machine for automatically forming solder into coils, a rotating spindle on the outer periphery of which the solder is adapted to be wound, a tube for directing the solder to the spindle, means for causing one end of the solder to become attached to the spindle, and means for removing the coil from the spindle.

10. In an automatic coiling machine, an axially forked spindle, means for feeding the leading end of the material to be coiled into the fork in the spindle, and means for rotating the spindle several revolutions to cause the material to be wound in a multiple-layer coil on the outside of the spindle.

11. In an automatic coiling machine, an axially forked spindle, means for feeding the leading end of the material to be coiled into the fork in the spindle several revolutions to cause the material to be wound in a multiple-layer coil on the outside of the spindle, means for rotating the spindle, and means for stripping the completed coil from the spindle.

12. In an automatic coiling machine, a pair of constantly rotating shafts, a pair of spindles in axial alignment with the shafts, means for shifting the spindles alternately into clutched engagement with the shafts, and means for feeding the material to be coiled first to one spindle and then to the other.

13. In a machine for automatically forming core solder into coils, a rotating spindle to which the solder is fed, means for causing one end of the solder to become attached to the spindle, means for cutting the solder into a predetermined length, and means for flattening out the solder adjacent the cut in order to seal the same.

14. In an automatic coiling machine, a spindle, means for feeding the material to be coiled to the spindle, means for measuring the material and cutting it into a predetermined length, means for rotating the spindle, and means for causing the machine to stop when a deformity appears in the material to be fed without disturbing the operation of the measuring means.

15. In an automatic coiling machine, a spindle of substantially the same diameter as the inside of the coil to be formed, means for feeding the material to be coiled into engagement with the spindle, means for rotating the spindle through a number of revolutions to cause the material to be wound directly thereon in a multiple layer coil formation, means for cutting the material at a predetermined point to complete the coil, and means for stripping the completed coil from the spindle.

16. In an automatic coiling machine, a spindle of substantially the same diameter as the inside of the coil to be formed, means for feeding the material to be coiled into engagement with the spindle, means for rotating the spindle through a number of revolutions to cause the material to be wound directly thereon in a multiple layer coil formation, means within the spindle for causing the leading end of the material to be engaged and held against withdrawal by being bent by rotation of the spindle, means for cutting the material at a predetermined point to complete the coil, and means for stripping the completed coil from the spindle.

ANDREW F. STERNAD.

CERTIFICATE OF CORRECTION.

Patent No. 1,942,264.  January 2, 1934.

ANDREW F. STERNAD.

It is hereby certified that error appears in the printed specification of the above numbered patent requiring correction as follows: Page 4, lines 19 and 20, claim 11, strike out the comma and words ",means for rotating the spindle" and insert the same after "spindle" in line 17; and that the said Letters Patent should be read with this correction therein that the same may conform to the record of the case in the Patent Office.

Signed and sealed this 15th day of May, A. D. 1934.

Bryan M. Battey (Seal) Acting Commissioner of Patents.